United States Patent
Berard et al.

(10) Patent No.: US 9,319,882 B2
(45) Date of Patent: Apr. 19, 2016

(54) METHOD FOR MUTUAL AUTHENTICATION BETWEEN A TERMINAL AND A REMOTE SERVER BY MEANS OF A THIRD-PARTY PORTAL

(71) Applicant: GEMALTO SA, Meudon (FR)

(72) Inventors: Xavier Berard, La Ciotat (FR); Richard Pico, La Ciotat (FR); Frederic Faure, La Ciotat (FR); Benoit Gonzalvo, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/439,167

(22) PCT Filed: Oct. 25, 2013

(86) PCT No.: PCT/EP2013/072451
§ 371 (c)(1),
(2) Date: Apr. 28, 2015

(87) PCT Pub. No.: WO2014/067880
PCT Pub. Date: May 8, 2014

(65) Prior Publication Data
US 2015/0289135 A1   Oct. 8, 2015

(30) Foreign Application Priority Data
Oct. 29, 2012   (EP) .................................... 12306346

(51) Int. Cl.
*G06F 7/04* (2006.01)
*H04W 12/06* (2009.01)
(Continued)

(52) U.S. Cl.
CPC ........... *H04W 12/06* (2013.01); *H04L 63/0853* (2013.01); *H04L 63/0869* (2013.01); *H04W 4/003* (2013.01)

(58) Field of Classification Search
CPC . H04L 63/0853; H04L 63/0869; H04L 63/10; H04L 29/06; H04L 67/04; H04W 12/06
USPC .......................................... 370/401; 726/7, 9
See application file for complete search history.

(56) References Cited

U.S. PATENT DOCUMENTS

| 2007/0145119 A1 | 6/2007 | Rhelimi |
| 2011/0030043 A1 | 2/2011 | Jones et al. |

(Continued)

FOREIGN PATENT DOCUMENTS

| EP | 1 695 296 A2 | 8/2006 |
| EP | 2 106 093 A | 9/2009 |

(Continued)

OTHER PUBLICATIONS

International Search Report (PCT/ISA/210) mailed on Feb. 4, 2014, by the European Patent Office as the International Searching Authority for International Application No. PCT/EP2013/072451.

(Continued)

*Primary Examiner* — Brian Shaw
(74) *Attorney, Agent, or Firm* — Buchanan Ingersoll & Rooney PC

(57) ABSTRACT

Mutual authentication between: (i) a user terminal cooperating with a security element and an application for registering with a service, and (ii) a remote server that provides the service, by means of a third-party portal, includes: i) transmitting, to the remote server by means of the portal, signed information R enabling the security element to be authenticated in the remote server; ii) authenticating the security element in the remote server; iii) transmitting a value R' signed by the remote server to the application by means of the portal; iv) transmitting a request for verification of the signed value R' from the application to the security element; v) verifying, in the security element, the signature of the remote server and whether the requested service has been granted by the remote server; vi) establishing a secure connection with the remote server using the security element, and requesting that the service be executed.

6 Claims, 2 Drawing Sheets

(51) Int. Cl.
*H04L 29/06* (2006.01)
*H04W 4/00* (2009.01)

(56) References Cited

U.S. PATENT DOCUMENTS

2013/0283040 A1* 10/2013 Tu .................. H04W 4/003
                                           713/155
2013/0291084 A1   10/2013 Amiel et al.

FOREIGN PATENT DOCUMENTS

EP        2 458 808 A1    5/2012
WO   WO 2005/062236 A2    7/2005

OTHER PUBLICATIONS

S. Suoranta et al., "Strong Authentication with Mobile Phone", Sep. 19, 2012, pp. 70-85.

* cited by examiner

METHOD FOR MUTUAL AUTHENTICATION BETWEEN A TERMINAL AND A REMOTE SERVER BY MEANS OF A THIRD-PARTY PORTAL

The field of the invention is that of telecommunications and relates to a method for mutual authentication between a terminal and a remote server by means of a third-party portal.

The terminal is typically a user terminal, such as a mobile phone, a PDA or a smartphone. It typically includes a security element such as a SIM or USIM card, generically called UICC. The security element may also be an e-UICC ("embedded UICC", i.e. a chip integrated in the user terminal (for instance welded in this terminal) used as a UICC). The security element comprises elements (keys, directories, software, files . . . ) enabling the user of the terminal to authenticate with a typically cellular telecommunications network, and to establish communications (voice, data . . . ). A security element of this type meets ETSI standards.

The security element may also not be included in the terminal but communicate therewith by radio. In a particular embodiment, the security element may for example be integrated in a device carried by the user of the terminal and communicate with the terminal via Bluetooth, WiFi or a technology based on IEEE 802.15.4 standard. A terminal having no UICC card but communicating with such card (or an e-UICC) remote therefrom by a few dozens of centimeters up to a few meters or dozens of meters, is then substituted for a conventional mobile terminal system comprising a UICC card. See, for example the eGo system described in the http://www.ego-project.eu site and in patent EP-1.695.296.

Within the scope of the present invention, the user terminal thus cooperates with a security element such as a UICC or an e-UICC.

The user terminal or the UICC comprises an application for registering with a service. "Application for registering with a service" means an application making it possible to request a service from a remote server. The remote server is typically an OTA platform. The service may be a for example a banking application to be downloaded. It may also be a subscription to a service such as a daily electronic newspaper.

In one particular embodiment, the service may be the activation of a subscription to a cellular network, or the downloading of keys, directories, software and files making it possible to establish such subscription. The latter case corresponds to a remote customization of a subscription provided by a so-called SM (Subscription Manager) server. The service may also consist in requesting the rocking of a subscription to another one, run by the same operator or another one.

A SM server is a server making it possible to remotely customize security elements (by means of an OTA), for example in order to download therein elements enabling to authenticate the user via a telecommunications network. It may also consist in downloading a complete subscription into the UICC, with the latter registering for example with the server using temporary identifiers.

Within the scope of the present invention, the user terminal communicates with the remote server by means of a third-party portal, as shown in FIG. 1.

A user terminal 10 cooperates with a security element 11 (an integrated or remote UICC or e-UICC) and comprises an application 12 for registering with a service. The terminal 10 communicates with a remote server 13, for example by radiofrequency, by means of a third-party portal 14. The remote server 13 is for example an OTA platform suitable for providing the service requested by the terminal 10.

The portal 14 is for example the one of a seller of the terminal 10 who must know the state of the terminal 10 (type and version of the downloaded software, active or inactive state, . . . ). The application 12 cannot directly contact the server 13 and thus must use this third-party portal 14.

In another embodiment, the user of the terminal initiates a communication with the portal 14, for example in order to download a subscription to a cellular network. Such initiation is operated by the man-machine interface of the terminal 10, for example by activating a function in a drop-down menu. The communication with the portal 14 may also be established by means of the application 12 upon the first powering on of the terminal 10.

In FIG. 1, a first step 20 consists in authenticating the terminal 10 with the portal 14. A secure connection of the https type is established. During a step 21, the application 12 transmits to the portal 13 a request for a service accompanied with an identifier of the security element 11, for example the serial number that uniquely identifies it. Such identifier will then generally be called an eUICCid, whether it identifies a UICC or an eUICC.

During a step 22, the portal re-transmits the request for a service and the identifier of the security element 11 to the remote server 13. The latter then verifies, during a step 23, the rights of access to the requested service of the security element 11. Such checking consists in verifying that the eUICCid has been recognized by the server 13 and that such eUICC has the right to request this service.

If the right to the service is granted, the server 13 directly addresses the security element 11 (step 24) for it to initiate a secure communication based for example on shared keys ("TLS-PSK handshake"). A secure communication is thus established between the security element 11 and the server 13.

The security element 11 then sends a request of the HTTP POST type with TLS-PSK to the server 13, together with the requested service (step 26). The rest of the process is then conventional (supply of the service to the security element, checking that the requested service has been received, end of the secure communication, recording in the server 13 that the security element has received the requested service).

FIG. 2 shows a possible alternative solution for establishing a communication between a user terminal and a remote portal.

In this alternative solution, the user, bearing reference number 15, has a terminal 10 and a telecommunications terminal 16, such as a computer. The computer 16 is able to connect, for example via the Internet, to the portal 14. The computer 16 includes an application 12 for registering with a service shown in FIG. 1.

The user here is responsible for transmitting to the portal 14 the identifier of the eUICC (the eUICCid) or a code mentioned on the box packing the terminal 10. Such identifier may also be written on the terminal 10 or printed on the security element as a card (UICC). After the application 12 which is present in the computer 16 or the user 15 has authenticated (step 20), the user 15 enters the unique identifier for the UICC or eUICC by means of the man-machine interface of the telecommunications terminal 16 which transmits it to the portal 14 (step 21). The identifier is accompanied by the service requested by the security element. The steps 22 through 26 are then similar to those of FIG. 1.

The problem entailed in these two modes of access to a service is a safety issue. As a matter of fact, different attacks are possible: the remote server 13 cannot be sure that the person requesting the service is the owner of the UICC because the latter can be removed from the terminal (when it is a SIM card or a SD card for example).

A hacker may also take over the third-party portal 14 and request the service to be executed on any UICC or eUICC. This therefore creates undue billings or denial of service for the end user (in the case of a SM for example, the requested service may be a subscription cancellation).

Finally, a hacker may intercept any request for a service and replay the request for a service, which generates a denial of service at the server 13 when the user makes a new request for the same service to be executed.

The present invention aims at strengthening security at the third-party portal, and the latter may have weaknesses as regards security and at providing a system which the remote server 13 and the user may trust.

This objective, as well as others that will appear later, is reached through a method for mutual authentication between, on the one hand, a user terminal cooperating with a security element as well as an application for registering with a service and, on the other hand, a remote server by means of a third-party portal, with the remote server being suitable for providing the requested service.

According to the invention, the method consists in:
 i—after authenticating the user of the user terminal with the portal, transmitting to the remote server, by means of the portal, signed information R enabling the security element to be authenticated in the remote server, and a request for a service;
 ii—authenticating the security element in the remote server, and if the security element is recognized:
 iii—transmitting a value R' signed by the remote server, from the remote server to the application by means of the portal, with the value R' including the information and a URL address making a response to the request possible;
 iv—transmitting a request for verification of the signed value R' from the application to the security element;
 v—verifying in the security element the signature of the remote server and whether the requested service has been granted by the remote server;
 vi—establishing, a secure connection to the remote server from the security element, and requesting the service be executed.

Advantageously, the information comprises an identifier of the security element.

The information is preferably concatenated with an anti-replay value.

Advantageously, the information is concatenated with a random value.

The information is preferably signed by a mac.

In a first embodiment:
 Step—i—consists in transmitting the signed information R generated by the security element by means of the user terminal;
 Step—iii—consists in directly transmitting the signed value R' from the portal to the application.

In a second embodiment:
 Step—i—consists in transmitting the signed information from a telecommunication terminal to the remote server, by means of the portal;
 Step—iii—consists in transmitting the signed value R' from the portal to the telecommunications terminal and prompting the user of the telecommunications terminal to enter the signed value R' received into the user terminal via its man-machine interface, with the signed value R' being transmitted to the application.

Other characteristics and advantages of the invention will appear from the following description of two embodiments of the invention, given for illustrative and not restrictive purposes, and the appended figures wherein.

Figure 1:
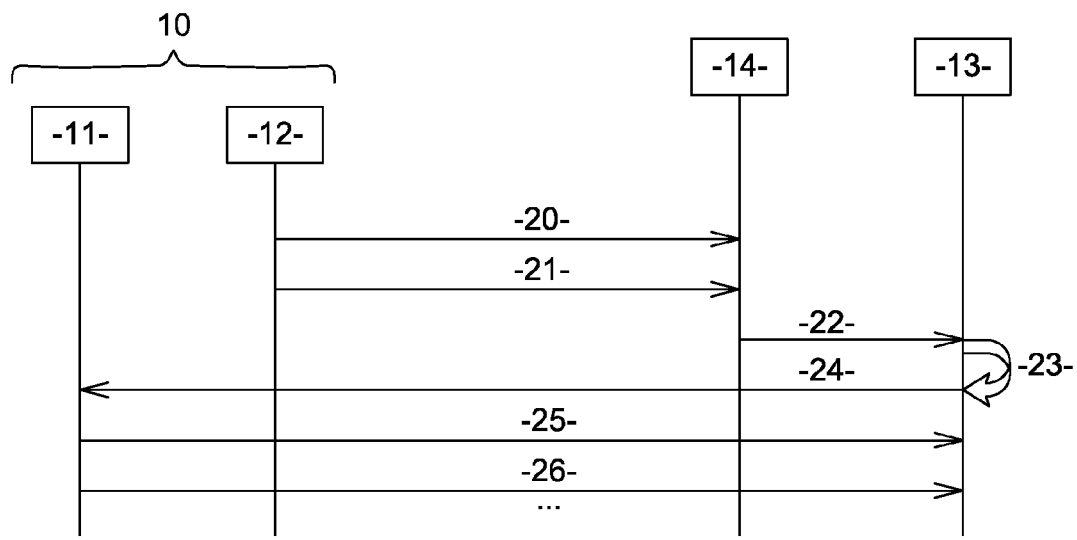
FIG. 1 shows a system for requesting a service, wherein a terminal cooperating with a security element initiates a service request.
Figure 2:
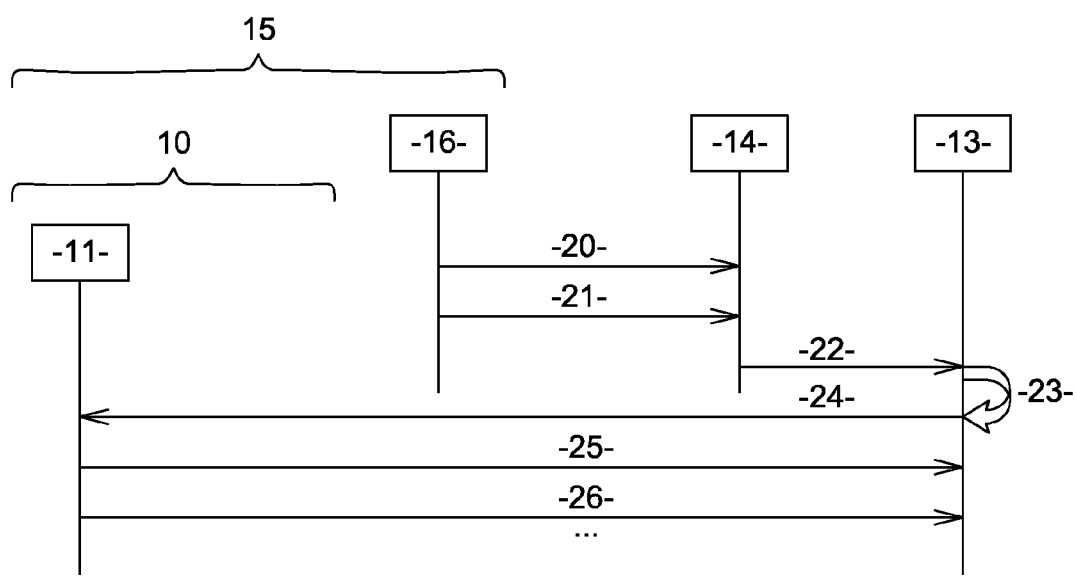
FIG. 2 shows a system for requesting a service, wherein a user uses a telecommunication terminal like a computer to initiate a service request.

FIGS. 1 and 2 have been described previously.

Figure 3:
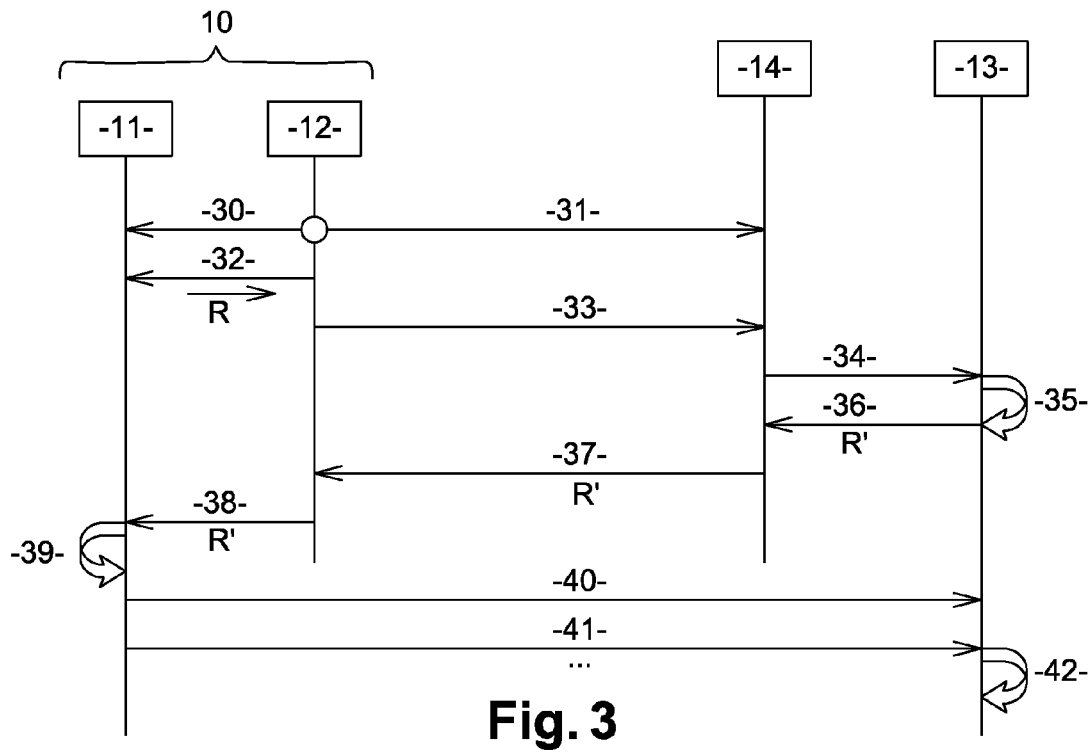
FIG. 3 shows a system for requesting a service, wherein according to a first embodiment of the invention.

FIG. 3 shows a system for requesting a service according to a first embodiment of the invention.

In the system of FIG. 3, a terminal 10 cooperating with a security element 11 initiates a request for a service. The terminal 10 or the security element 11 comprises an application 12 for registering with a service that may be provided by the remote server 13 by means of a third-party portal 14.

During a first step 30, which is optional if the application is installed in the security element 11 or if the security element is an eUICC, the application 12 is authenticated by the security element 11. This is also true if the control of the access of the application 12 to the security element 11 by such security element 11 is desired. Such authentication of the application corresponds to an authentication of the user who will have entered his/her PIN code into the terminal, for example beforehand. The application 12 may for example be a Java midlet complying with JSR177 specification or a simple browser operating a SCWS (Smart Card Web Server) installed within the security element 11. After authentication of the application 12, the security element returns 11 an authorization to request a service from the server 13 during a step 32. Signed information R enabling the server 13 to authenticate the security element 11 is appended to such authorization.

In one embodiment, such information is an identifier of the security element 11, such as its UICCid or eUICCid (serial number) and the signature is a mac of the identifier. So we have:

$$R = \text{eUICCid} \, \| \, \text{mac} \quad (1)$$

The mac is calculated from a key $K_{euiccid}$ calculated from the eUICCid of the security element.

The information may also be signed according to the conventional patterns of symmetric or asymmetric encryption.

An anti-replay value AR may also be concatenated with the identifier, in order to ensure that the security element will not request the same service from the remote server 13 twice and to sign the set. In this case we preferably have:

$$R = [\text{eUICCid}, \text{AR}] \, \| \, \text{mac} \quad (2)$$

The preferred solution consists in concatenating a random value VA with the identifier and with AR and also in signing the set, for example:

$$R = [\text{eUICCid}, \text{AR}, \text{VA}] \, \| \, \text{mac} \quad (3)$$

Adding a random value VA, generated by the security element 11, makes it possible to change the encryption even though the AR value is identical in both requests for services. This may happen if the counter of the value of the anti-replay AR is reset. Using VA thus makes it possible to check that the same sequence (generation of two identical values of R at two different times) will never be repeated twice.

Simultaneously with step 30, the application 12 authenticates (step 31) with the portal 14 as previously explained with reference to FIG. 1 (step 20).

The R value is transmitted to the application 12 after step 32 and is relayed by this application 12 to the portal 14, together with the requested service (step 33). The portal 14 re-transmits the data (R and the service requested) to the server 13 (step 34) which in particular performs the following checks (step 35):

- (optional) Authentication of the portal 14;
- The identity of the security element: eUICCid or UICCid, its signature (mac), the anti-replay value AR and the random value VA guarantee that the security element 11 only may have generated the value R;
- The service materialized by the request R has not been already provided beforehand (value RA).

The server 13 may operate according to a secret key schema or in PKI. In any case, the server 13 knows the eUICCid (UICCid) of the security elements allowed to request services on its behalf as well as the secret keys $K_{euiccid}$ associated thereto. The MACs are generated from these secret keys. The recognition of a MAC means that the eUICC, which originated it, is saved at the server 13.

The MAC not only provides a function of verification of the integrity of the data received, as a simple hash function would make it possible, but it additionally authenticates the sender, i.e. the holder of the secret key.

Upon completion of such checks, the server 13 returns a signed value R' (step 36) including the information R received as well as the requested service. This service is for example a URL address making a response to said request possible.

Preferably, we have:

$$R'=[eUICCid,AR,VA,URL,R] \text{ II mac}$$

with mac being this time the signature of the server and AR being the anti-replay value received from the security element 11. Returning R (optional) makes it possible to execute a double check at the security element 11, by verifying that the R sent is the same as the one received.

The value R' is transmitted to the portal 13 which returns it (step 37) to the application 12. The application 12 may then (step 38) request the security element 11 to initiate the requested service. The security element 11 checks, during a step 39, by means of the value R' received, that:

- The service has been requested from the right server 13 (verification of its mac signature);
- The R received is identical with the one sent (optional step);
- The server 13 authorized the execution of the service (presence of a URL address, for instance).

During a step 40, the security element 11 then establishes a secure connection with the server 13 (TLS-PSK handshake) and requests the service to be executed (step 41) by means of the URL address included in the response R' from the server 13 (HTTP POST/service R'). During a final step 42, the server can check the value of R' to make sure that the security element 11 is correctly connected thereto for the execution of the requested service.

Figure 4:
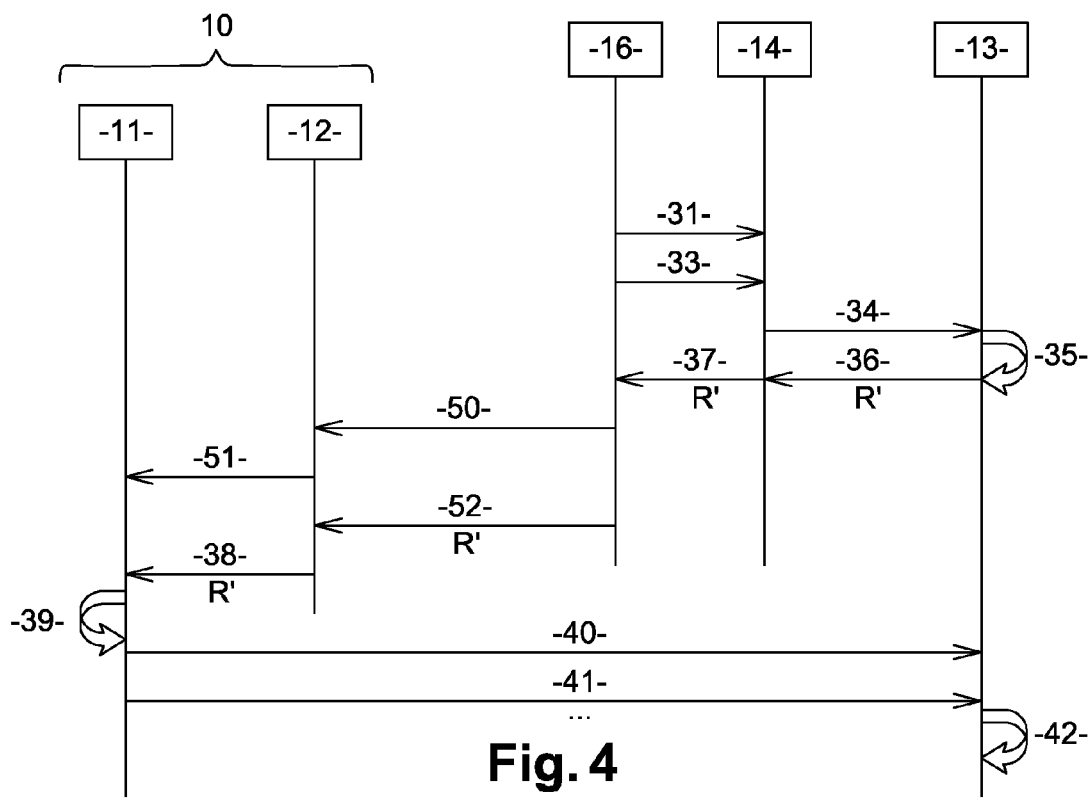
FIG. 4 shows a system for requesting a service according to a second embodiment of the invention.

FIG. 4 shows a system for requesting a service according to a second embodiment of the invention.

In this second embodiment, similar to that of FIG. 2, the user has no access to his/her terminal 10 during the first steps of the method or the application has no access to the third-party portal 14. The user is for example in one of the terminal retail outlets during the execution of steps 31 to 37.

Using a telecommunications terminal 16, such as a computer, the end user or a person selling the terminal 10 authenticates with the portal 14 (step 31). Then it communicates (step 33) the identity of the security element 11 to the portal 14, together with the requested service. As indicated above, such identity may be one of the three signed pieces of information mentioned in the equations 1-3 above.

Such signed information as well as the requested service are transmitted from the portal 14 to the server 13 (step 34) which executes the same checks as mentioned while referring to FIG. 3 (step 35). The server 13 responds by returning the value R' to the portal 14 (step 36) which re-transmits it (step 37) to the telecommunications terminal 16. The value R' is then displayed on the terminal 16 screen.

Step 50 may be executed later, for example at the user's home. It consists in launching the application 12. The application 12 then authenticates with the security element 11 (step 51) and it is then necessary to manually enter R' into the user's terminal (step 52: entry of R' into the user's terminal 10 using its man-machine interface). The value of R' is recovered by the application 12 and the security element 11 is then requested (step 38) to check the value of R' (step 39). The steps 40-42 are identical to those described while referring to FIG. 3.

Step 52 may precede the authentication step 51. Similarly, step 52 may consist in scanning the received R' using the terminal 10. The R' may also be a QR code.

The value of R (an alphanumeric code, for example) may be included within the terminal 10 packaging (box) (and not outside, to avoid a denial of service issue) in such second embodiment.

The terminal 10 may be a simple mobile telephone or a modem integrated in a machine, for example a motor vehicle. The invention is more particularly applicable to M2M communications, i.e. communications between machines.

The invention makes it possible to obtain a mutual authentication between the security element 11 and the server 13, unlike the solutions described with reference to FIGS. 1 and 2, wherein the third-party portal 14 only authenticates itself with the server 13.

The invention claimed is:

1. A method for mutual authentication between (i) a user terminal cooperating with a security element as well as an application for registering with a service, and (ii) a remote server by means of a third-party portal, said remote server being suitable for providing said service, said method comprising:

step i—after authenticating the user of said user terminal with said third-party portal, transmitting to said remote server by means of said third-party portal, signed information R, to enable said security element to be authenticated in said remote server, as well as a service request, wherein R comprises an identifier of said security element;

step ii—authenticating said security element in said remote server, and if said security element is recognized:

step iii—transmitting a value R' signed by said remote server from said remote server to said application by means of said third-party portal, said value R' including said s fined information R as well as a URL address making a response to said service request possible;

step iv—transmitting a request for verification of said signed value R' from said application to said security element;

step v—verifying, in said security element, the signature of the remote server and whether the requested service has been granted by said remote server;

step vi—establishing a secure connection with said remote server from said security element, and requesting that said requested service be executed.

2. The method according to claim 1, wherein said signed information R is concatenated with an anti-replay value.

3. The method according to claim 1, wherein said signed information R is concatenated with a random value.

4. The method according to claim 1, wherein said signed information R is signed by a message authentication code (mac).

5. The method according to claim 1, wherein:
- step i—comprises transmitting said signed information R generated by said security element by means of said user terminal; and
- step iii—comprises directly transmitting said signed value R' from said third-party portal to said application.

6. A method according to claim 1, wherein:
- step i—comprises transmitting said signed information R from a telecommunications terminal to said remote server by means of said third-party portal; and
- step iii—comprises transmitting said signed value R' from said third-party portal to said telecommunications terminal and prompting the user of said telecommunications terminal to enter said signed value R' received into said user terminal via its man-machine interface, with said signed value R' being transmitted to said application.

* * * * *